United States Patent [19]
Sisskind et al.

[11] Patent Number: 6,079,613
[45] Date of Patent: Jun. 27, 2000

[54] HEAT SUPPRESSING WRAP

[75] Inventors: Michael Sisskind, Charlotte; Frank Darryl Brooks, Matthews, both of N.C.

[73] Assignee: Plumber's Guardian, Inc., Charlotte, N.C.

[21] Appl. No.: 09/173,340

[22] Filed: Oct. 15, 1998

Related U.S. Application Data

[60] Provisional application No. 60/077,528, Mar. 11, 1998.

[51] Int. Cl.[7] ................................. B23K 5/22; F16P 1/06
[52] U.S. Cl. ........................... 228/222; 228/59; 228/119; 138/97; 285/15; 442/136
[58] Field of Search ............................ 442/136; 252/604, 252/605, 608; 106/18.11; 428/920, 921; 285/21.1, 21.3, 294.2; 228/46, 50, 59, 119, 214, 222; 156/282, 304.2, 304.6, 498; 29/402.13, 890.054; 15/104.93; 219/61.7; 138/103, 120, 123

[56] References Cited

U.S. PATENT DOCUMENTS

| | | |
|---|---|---|
| 2,188,925 | 2/1940 | Ronay . |
| 3,372,852 | 3/1968 | Cornell . |
| 3,430,686 | 3/1969 | Parkison . |
| 3,494,020 | 2/1970 | Cornell . |
| 3,593,409 | 7/1971 | Silverstein . |
| 3,929,270 | 12/1975 | Keith . |
| 3,972,466 | 8/1976 | Keith . |
| 4,920,000 | 4/1990 | Green ...................................... 428/288 |
| 5,001,320 | 3/1991 | Conley et al. ............................. 219/61 |
| 5,634,672 | 6/1997 | Stack et al. ................................ 285/54 |

FOREIGN PATENT DOCUMENTS

| | | | |
|---|---|---|---|
| 52-152599 | 12/1976 | Japan ............................ | D06M 11/00 |

*Primary Examiner*—Patrick Ryan
*Assistant Examiner*—Colleen Cooke
*Attorney, Agent, or Firm*—Christopher C. Dremann, PC; Christopher C. Dremann

[57] ABSTRACT

A heat suppressing wrap is provided for suppressing the transfer of thermal energy along a pipe during a thermal joining operation, such as a high temperature, open flame welding, brazing or soldering operation. The heat suppressing wrap is a blended fabric cloth made of at least 50% cotton that is saturated with a liquid solution of a heat, fire and smoke inhibiting agent, and preferably, a fire fighting agent. The fire fighting agent is preferably a fire fighting foam, and most preferably, is PYROCAP B-136™ fire fighting foam manufactured by PYROCAP International, Inc. of Woodbridge, Va. Short lengths of the wrap are rolled and placed in a container with the liquid solution so that the cloth wraps remain saturated with the fire fighting agent. The wraps are then positioned, and preferably wrapped, over the pipe adjacent a pipe joint to greatly reduce the transfer of thermal energy along the pipe generated by the thermal joining operation. It has been found that the area away from the pipe joint is maintained at or about room temperature even if the temperature of the pipe in the vicinity of the pipe joint exceeds about 875° Fahrenheit.

11 Claims, 2 Drawing Sheets

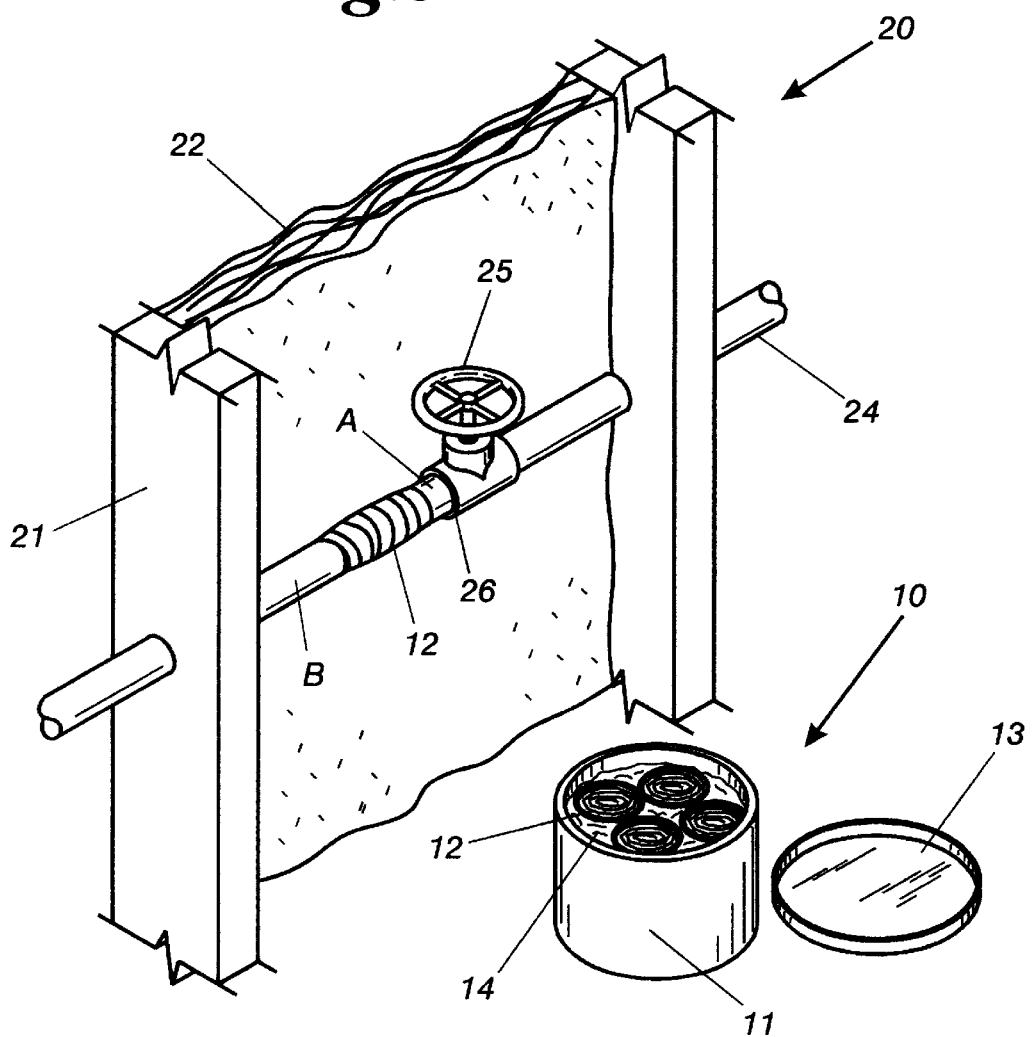

HEAT SUPPRESSING WRAP

CROSS REFERENCE TO RELATED APPLICATIONS

This application claims the benefit of U.S. Provisional application Ser. No. 60/077,528 filed Mar. 11, 1998.

FIELD OF THE INVENTION

The invention relates to a heat suppressing wrap, and more particularly, to a wrap made of a fabric cloth saturated with a heat, fire and smoke inhibiting agent for suppressing the transfer of thermal energy that is generated during a thermal joining operation.

BACKGROUND OF THE INVENTION

Metal, and particularly copper, pipes are often joined by a thermal joining operation, such as a high temperature, open flame welding, brazing or soldering operation. In certain instances, a first section of metal pipe is joined to a second section of metal pipe by a short length of connector pipe, such as an elbow joint, to alter the direction of the flow inside the continuous conduit formed by connecting the pipes. In other instances, a valve that can be alternately opened and closed to permit and prevent flow through a pipe is inserted at a convenient location along the pipe. Regardless, the joining operation is typically utilized to join the connector pipe or valve to the pipe at each point, known as a "joint," where the connector pipe or valve intersects the pipe.

During a thermal joining operation, it is high desirable to confine the thermal energy generated by the thermal joining apparatus to an area immediately adjacent the joint. Otherwise, thermal energy transferred along the pipe can cause damage to the connector pipe or valve, or to other pipe joints. In the case of welding a valve between a break in a pipe, the heat transferred along the pipe can destroy the seals or gaskets, which are usually made of rubber, inside the valve. Similarly, the heat generated by the thermal joining apparatus can distort the metal pipe, or can distort metal components within the pipe or within a valve positioned inside the pipe. In addition, the heat transferred along the pipe away from the joint can possibly ignite combustible structure or materials in the vicinity of the joint.

Various means and methods are known for suppressing the transfer of heat generated by an high temperature, open flame joining operation. U.S. Pat. No. 3,430,686 to Parkison et al. discloses a heat shield which is wrapped around a pipe between the area of the joint and the area to be protected from the heat generated by the joining operation. The heat shield includes a micro-encapsulated coolant, such as oil or water, which is released during the joining operation as the microcapsules melt. The heat generated by the joining operation is transferred to the coolant, thus causing the coolant to evaporate and dissipate the heat in the form of steam. Such heat shields, however, are ineffective for suppressing the transfer of heat generated by a high temperature, open flame joining operation because a significant portion of the heat is nevertheless transferred along the pipe beyond the heat shield.

U.S. Pat. No. 3,593,409 to Silverstein discloses a paste, or putty, made of a water swollen bentonite clay. The putty is applied to the pipe between the area of the joint and the area to be protected during the joining operation. The putty absorbs and dissipates a portion of the thermal energy. Unfortunately, the putty is not capable of absorbing and dissipating the heat typically generated during a high temperature, open flame joining operation. Further, the putty melts easily, thus forming molten droplets which may come in contact with structure or materials in the vicinity of the joint, and must be reapplied to the pipe often during the thermal joining operation.

In a particular thermal joining operation, the need to greatly suppress the heat transferred along a pipe is extremely important. The risk of fire is significantly increased when a break or leak in an existing run of pipe embedded in a wall is repaired. A small portion of the wall is typically removed to expose the damaged or leaking section of the pipe between the vertical studs of the wall. The opening in the wall is made as small as possible to limit the extent of the subsequent repair to the wall. As a result, the operator of the thermal joining apparatus, for example a welding torch, must work in a confined area. Accordingly, it is generally not possible for the operator to utilize a heat shield that is cumbersome or produces an off-gas.

Although there is typically sufficient space to apply a heat suppressant putty to the pipe, molten droplets of the putty are produced when the putty melts which may adhere to the structure and materials behind the wall. Typically, it can be expected that there will be insulation or other combustible building materials in the area adjacent the joint. If left unprotected, these materials may ignite during the thermal joining operation and cause a fire. More alarming, the materials may smolder for several hours before igniting. It is not uncommon for a fire to ignite several hours after a plumbing repair has been completed and the opening in the wall has been covered. Naturally, a fire which starts behind a wall can cause substantial damage to the infrastructure of the building before being detected.

For these reasons, and others, it is highly desirable to suppress the thermal energy that is transferred along a pipe when a joint is formed by a thermal joining operation, such as a high temperature, an open flame welding, brazing or soldering operation. Although many means for suppressing the heat generated by a high temperature joining operation have been proposed, none reduces the transfer of thermal energy along a pipe sufficiently to prevent damage to connector pipes, valves and other pipe joints, and to prevent the possibility that structure or materials in the vicinity of the joint may ignite.

Accordingly, it is a principle object of the present invention to provide a means for suppressing the thermal energy generated in the area of a pipe joint during a thermal joining operation from transferring along the pipe to structure and materials in the vicinity of the joint.

It is another, and more particular, object of the invention to provide a means for conveniently and effectively reducing the transfer of heat along a pipe that is generated during a high temperature, open flame welding, brazing or soldering operation.

It is another, and still more particular, object of the invention to provide a heat suppressing wrap for greatly reducing the transfer of heat along a metal pipe behind a wall that is generated during a thermal joining operation, such as a high temperature, open flame welding, brazing or soldering operation.

BRIEF DESCRIPTION OF THE DRAWINGS

In view of these and other objects which will become more readily apparent as the nature of the invention is better understood, the invention consists in the novel combination and arrangement of parts hereinafter more fully described, illustrated and claimed with reference being made to the appended drawings in which:

FIG. 3 is a perspective view illustrating the use of the heat suppressing wrap of FIG. 1 to greatly reduce the transfer of heat along a metal pipe behind a wall that is generated during a high temperature joining operation.

DETAILED DESCRIPTION OF THE PREFERRED EMBODIMENTS

The invention is a heat suppressing wrap for suppressing the transfer of thermal energy along a thermally conductive pipe. The heat suppressing wrap of the invention greatly reduces the transfer of thermal energy generated during a thermal joining operation, such as a high temperature, open flame welding, brazing or soldering operation. The wrap is particularly well suited for use in a confined area, such as behind a wall, where the use of conventional means for suppressing heat, including thermal shields and puttys, is difficult or undesirable.

Use of the heat suppressing wrap protects the operator of the thermal joining apparatus from burn injury resulting from heating the pipe as well as from the superheated steam produced by the thermal joining operation. The reduction of steam not only protects the operator, but also minimizes the amount of moisture that may contaminate and weaken the joint. Use of the heat suppressing wrap also reduces the risk that the structure and materials behind the wall will be damaged during the thermal joining operation, or more importantly, will ignite after the joining operation is completed. In fact, it has been found through experimentation that the area away from the joint is maintained at or about room temperature even if the temperature of the pipe in the vicinity of the joint exceeds about 875° Fahrenheit.

Figure 1:
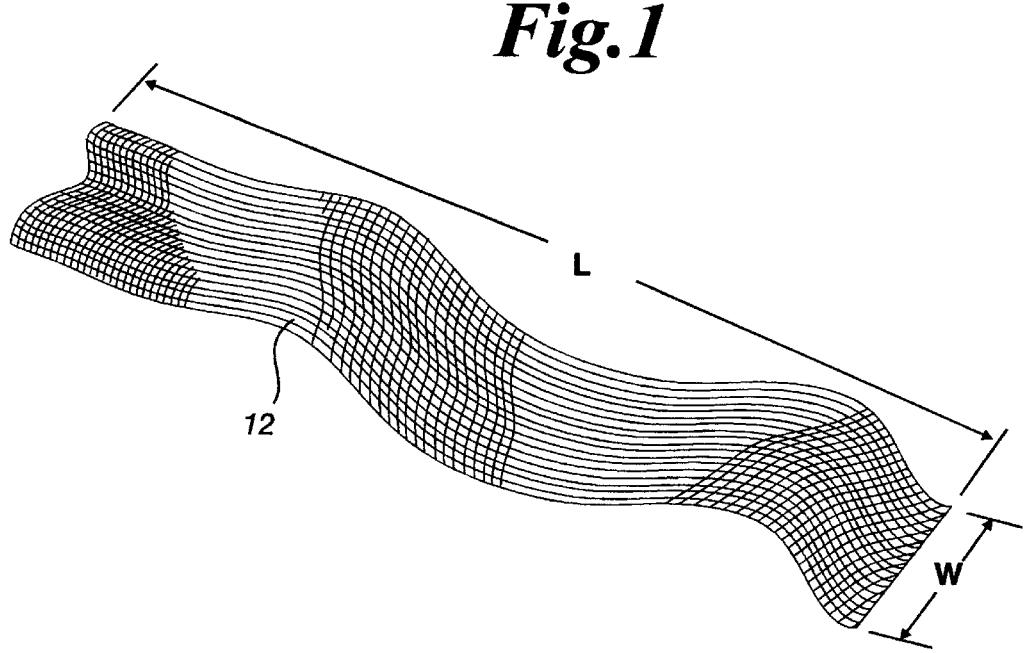
FIG. 1 is a perspective view of a heat suppressing wrap according to a preferred embodiment of the present invention.

FIG. 1 is a perspective view of a heat suppressing wrap, indicated generally at 12, according to the invention. In a preferred embodiment, the heat suppressing wrap 12 is made of a fabric cloth that is saturated with a liquid solution 14 (FIG. 3) comprising a heat, fire and smoke inhibiting agent. The fabric cloth may be made of any organic or synthetic fiber that is capable of being woven or formed into a fine mesh. Preferably, the wrap 12 is made of a blended fabric cloth comprising at least 50% cotton. More preferably, the wrap 12 is made of a blended fabric cloth comprising at least 80% cotton, such as 80% cotton and 20% polyester. Most preferably, however, the wrap 12 is made of a blended fabric cloth comprising about 90% cotton and about 10% polyester.

Preferably, the heat, fire and smoke inhibiting agent is a fire fighting foam. An example of a fire fighting foam that is suitable for use with the heat suppressing wrap 12 is PYROCAP B-136™ manufactured by PYROCAP International, Inc. of Woodbridge, Va. However, the invention is not intended to be limited to the use of PYROCAP B-136™. Any commercially available fire fighting foam having the efficacy of PYROCAP B-136™ is suitable for use. The remainder of the liquid solution 14 (FIG. 3) comprises de-ionized water, non-ionic and anionic surfactants, carbamide, oil of eucalyptus, diethylene glycol and inorganic salts.

Figure 2:
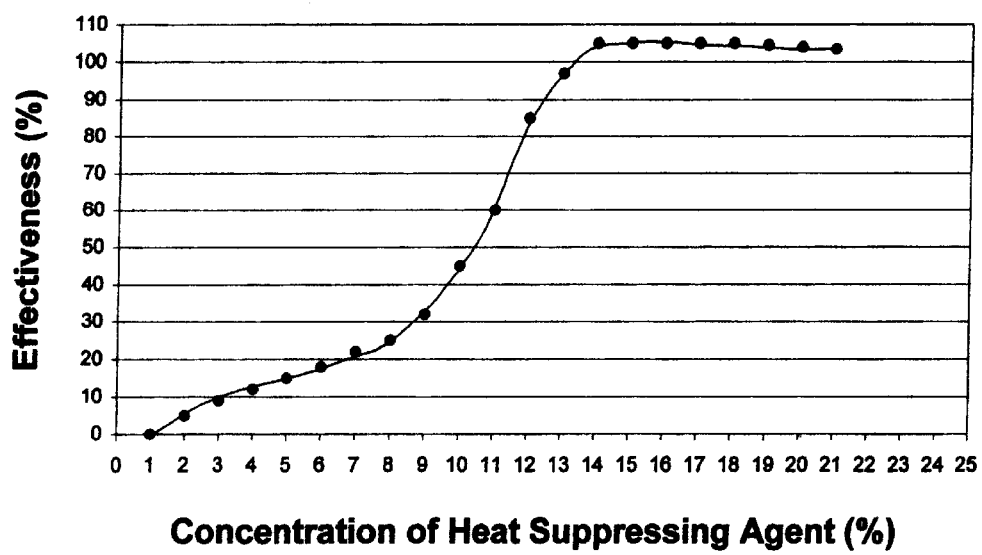
FIG. 2 is a graph of the effectiveness of the concentration of the heat, fire and smoke inhibiting agent in the liquid solution used to saturate the heat suppressing wrap of FIG. 1.

Various concentrations of the heat, fire and smoke inhibiting agent may be used ranging anywhere from between about 1% and about 30% of the agent by volume. The percentage by volume of the heat, fire and smoke inhibiting agent in the liquid solution 14 (FIG. 3) is preferably between about 8% and about 15%. However, as shown in FIG. 2, it has been found that the effectiveness of the wrap 12 (FIG. 1) does not increase significantly for concentrations of the heat, fire and smoke inhibiting agent greater than about 14% by volume.

FIG. 3 illustrates an example of a particular situation in which a commercial embodiment of the heat suppressing wrap, indicated generally at 10, may be used to repair a leaking pipe joint behind a wall. A typical wall construction, indicated generally at 20, comprising a pair of vertical 2×4 studs 21 with insulation 22 fitted between the studs has a pipe 24 embedded therein. An emergency shut-off valve 25 is joined to the pipe 24 medially between the studs 21 at a pipe joint 26 between the valve and the pipe. The pipe joint 26 is formed in a conventional manner by a thermal joining operation, such as a high temperature, open flame welding, brazing or soldering operation.

At least one heat suppressing wrap 12 is positioned, and preferably wrapped, around the pipe 24 between an area A adjacent the pipe joint 26 and an area B along the pipe away from the pipe joint. The wrap 12 greatly reduces the transfer of heat generated by the high temperature joining operation along the pipe 24, and thus reduces the risk that the wall studs 21 and/or the insulation 22 will ignite as a result of the repair. In particular, the heat suppressing wrap 12 greatly reduces the possibility that the wall studs 21 and/or insulation 22 will ignite long after the plumbing repair has been completed and the opening in the wall has been covered.

The wraps 12 are formed in sections, or strips, of the fabric cloth having a length L (FIG. 1) equal to or greater than the circumference of the pipe 24 so that the wrap completely encircles the pipe at least one full turn. For convenience, the heat suppressing wraps 12 are formed in strips of the fabric cloth that are at least 2 inches in length L (FIG. 1) and at least 1 inch in width W (FIG. 1). Most preferably, however, the wraps 12 are formed in strips of the fabric cloth that are between about 10 and about 14 inches in length L (FIG. 1) and are about 2 ½ inches in width W (FIG. 1).

The individual sections of cloth are rolled for compact storage in a cylindrical container 11 and immersed in the liquid solution 14. Thus, each individual wrap 12 is saturated with the liquid solution 14 comprising the heat, fire and smoke inhibiting agent while stored in the storage container 11. The storage container 11 is provided with a lid 13 so that the container can be transported and stored without exposing the wraps 12 and the liquid solution 14 to degradation in the atmosphere.

When ready for use, a wrap 12 is removed from the container 11 and positioned over the pipe 24 adjacent to the area A of the pipe joint 26. Preferably, the wrap 12 is positioned on the pipe 24 by wrapping several turns of the wrap along the pipe in the direction away from the pipe joint. In some instances, it may be beneficial to wrap the pipe 24 once again in the opposite direction to ensure that the pipe is completely covered by the wrap 12. When the area A adjacent the pipe joint 26 is heated, the wrap 12 suppresses the transfer of thermal energy along the pipe to the area B to be protected. When the thermal joining operation is completed and the pipe 24 has cooled, the wrap 12 is simply left in place, or is removed and replaced in the container 11 to be reused, or is discarded.

It is apparent from the foregoing that the heat suppressing wrap of the present invention greatly reduces the transfer of thermal energy generated from a thermal joining operation, such as a high temperature, open flame welding, brazing or soldering operation. Accordingly, the wrap protects the operator of the thermal joining apparatus from burn injury and reduces the risk that the wall studs 21 and/or the insulation 22 in the wall 20 will ignite during or after the thermal joining operation. When positioned on the valve side of the joint, the wrap also serves to protect the internal components of the valve 25, such as the rubber seals and gaskets, from the thermal energy generated by the thermal joining operation.

It is to be understood that the forgoing description and specific embodiments shown herein are merely illustrative of the best mode of the invention and the principals thereof, and that various modifications and additions may be made to the apparatus by those skilled in the art without departing from the spirit and scope of the invention, which is intended to be limited only by the scope of the appended claims. For example, but without limitation, it should be noted that the liquid solution packaged in a pump spray bottle may be sprayed onto the heat suppressing wrap after the wrap has been applied to the pipe in the vicinity of the joint to insulate the structure and materials in the vicinity of the joint from the thermal energy generated by the thermal joining operation.

That which is claimed is:

1. A heat suppressing wrap for suppressing the transfer of thermal energy along a thermally conductive pipe, said wrap comprising:

a fabric cloth made of at least one fiber formed into a fine mesh, said fiber selected from the group consisting of organic and synthetic fibers; and a liquid solution comprising a fire fighting agent;

wherein said fabric cloth is saturated with said liquid solution.

2. A heat suppressing wrap according to claim 1 wherein said fabric cloth comprises at least 50% cotton.

3. A heat suppressing wrap according to claim 2 wherein said fabric cloth is a blended fabric cloth consisting of about 80% cotton and about 20% polyester.

4. A heat suppressing wrap according to claim 2 wherein said fabric cloth is a blended fabric cloth consisting of about 90% cotton and about 10% polyester.

5. A heat suppressing wrap according to claim 1 wherein said fire fighting agent is a fire fighting foam.

6. A heat suppressing wrap according to claim 1 wherein the percentage by volume of said fire fighting agent in said liquid solution is between about 1% and about 30%.

7. A heat suppressing wrap according to claim 6 wherein the percentage by volume of said fire fighting agent in said liquid solution is between about 8% and about 15%.

8. A heat suppressing wrap according to claim 1 wherein said liquid solution further comprises de-ionized water, non-ionic and anionic surfactants, carbamide, oil of eucalyptus, diethylene glycol and inorganic salts.

9. A heat suppressing wrap according to claim 1 wherein said fabric cloth is formed in an elongate strip having a generally perpendicular shape and wherein the length of the strip of said fabric cloth is equal to or greater than the circumference of the thermally conductive pipe.

10. A heat suppressing wrap according to claim 9 wherein the length of the strip of said fabric cloth is at least 2 inches and the width of the strip of said fabric cloth is at least 1 inch.

11. A heat suppressing wrap according to claim 10 wherein the length of the strip of said fabric cloth is between about 10 and about 14 inches in length and the width of the strip of said fabric cloth is about 2 ½ inches.

\* \* \* \* \*